United States Patent [19]

Dody et al.

[11] Patent Number: 5,602,063
[45] Date of Patent: Feb. 11, 1997

[54] LIGHTWEIGHT SPRAYABLE TUNDISH LINING COMPOSITION

[75] Inventors: Julie A. Dody, Easton, Pa.; Charles R. Rumpeltin, Jr., Odessa, Fla.

[73] Assignee: Minteq International, Inc., New York, N.Y.

[21] Appl. No.: 413,286

[22] Filed: Mar. 30, 1995

(Under 37 CFR 1.47)

[51] Int. Cl.$^6$ .................................................. C04B 35/03
[52] U.S. Cl. .................... 501/108; 501/109; 501/111; 501/119; 501/122; 266/280
[58] Field of Search .................................. 501/108, 111, 501/127, 109, 119, 122; 266/280

[56] References Cited

U.S. PATENT DOCUMENTS

| | | | |
|---|---|---|---|
| 4,022,358 | 5/1977 | Courtenay | 222/607 |
| 4,432,799 | 2/1984 | Salazar | 501/111 X |
| 4,623,131 | 11/1986 | Roberts | 266/280 |
| 4,673,697 | 6/1987 | Rowley | 523/218 |
| 4,687,752 | 8/1987 | Peters | 501/119 X |
| 4,874,726 | 10/1989 | Kleeb et al. | 501/120 X |
| 5,217,929 | 6/1993 | Taft | 501/111 X |
| 5,252,526 | 10/1993 | Whittmore | 501/127 |
| 5,284,296 | 2/1994 | Connors et al. | 239/10 |
| 5,302,563 | 4/1994 | Rumpletin et al. | 501/111 |
| 5,382,289 | 1/1995 | Bambauer et al. | 501/111 X |

*Primary Examiner*—Karl Group
*Attorney, Agent, or Firm*—Pennie & Edmonds

[57] ABSTRACT

The present invention discloses a low density basic refractory lining material with improved resistance to corrosion by molten slag and metal that is especially adapted for use as a disposable liner in molten metal containing vessels. This material incorporates hollow ceramic microspheres of alumina, silica or mixtures thereof, having diameters of between about 5 and 500 microns as a density reducing material. This material may also include a stiffening agent, a set retarding agent, a foaming agent to further reduce the density, a plasticizer, and a low temperature binder. The addition of the ceramic microspheres has been found to provide reduced open porosity, improving resistance to corrosion. Also, the invention relates to methods for applying the disposable lining and vessels which include the lining applied thereon.

19 Claims, No Drawings

LIGHTWEIGHT SPRAYABLE TUNDISH LINING COMPOSITION

TECNICAL FIELD

The present invention relates to lightweight, substantially alkali-free refractory compositions, characterized by the inclusion of a filler material, comprising hollow, ceramic microspheres, which reduces the density and the open porosity, increases the resistance to cracking during air curing or drying, and maintains the insulation properties of the refractory composition without compromising strength. These light weight refractory materials resist corrosion by slag and molten metals, and may be used for lining tundishes and other vessels for containing molten metals. Preferably, the lining compositions of the present invention are mixed with water and sprayed onto a permanent tundish lining to form a disposable lining for the tundish.

BACKGROUND OF THE INVENTION

Tundishes and ladles are intermediate containment vessels used in processing metals and metal alloys. These vessels contain a permanent refractory lining material, which is resistant to high temperatures. Typically, these permanent linings are formed from bricks or castables, and comprise 50 to 70% $Al_2O_3$. Although these permanent lining materials are highly resistant to elevated temperatures, contact with molten metal and slag, and numerous heating and cooling cycles during the processing of molten metals can degrade the permanent liner, so that frequent replacement of the permanent liner is required. Therefore, disposable liners, formed of dry vibratable, trowellable, gunnable, or sprayable refractory materials are formed upon the permanent liner of a tundish or other molten metal processing vessel to extend the useful life of the permanent liner.

The disposable lining acts as a thermal and chemical barrier, which protects the permanent liner, and, simultaneously, maintains the temperature of the molten metal. After one or more heats of molten steel are put through the tundish, the disposable liner must be replaced. As the disposable lining material has a coefficient of thermal expansion that differs from that of the permanent liner, it would be expected that "deskulling" or removal of the disposable liner would be easily accomplished. However, alkali oxides, such as, for example, $Na_2O$ and $K_2O$, often found in prior art refractory compositions, can react with the permanent lining material at elevated temperatures, and cause the two liners to fuse. As a result, deskulling of the disposable liner becomes difficult, and the permanent lining can be damaged during the deskulling process. In addition, contamination of the permanent liner caused by the fusion of the two liners increases the coefficient of thermal expansion of the surface of the permanent liner, and the difference in the rate of expansion of the surface and the remainder of the liner can result in sheet spalling and premature failure.

Water is generally added to the disposable lining composition in order to facilitate application by trowelling, gunning, or spraying. Sprayable prior art refractory compositions typically contain about 20 to 30 percent water, so that they may be pumped through a hose and sprayed when mixed with compressed air in a spray gun. However, sprayable refractory compositions can suffer from slumping, which is a condition in which a recently applied refractory material lacks the necessary adhesion to remain fixed to the surface to which it is applied. In addition, these sprayable refractory compositions often develop cracks during air drying or curing, increasing the surface area available to corrosion by molten slag and metal.

Substantially alkali metal-free, basic refractory materials, such as those disclosed in U.S. Pat. No. 5,302,563, the content of which is expressly incorporated herein by reference thereto, have been used to overcome these problems. Here, the term basic refers to the chemical properties of these materials, rather than the complexity of their compositions. Basic refractory materials include magnesia, magnesite, doloma, dolomite, olivine, calcia, or mixtures thereof. In addition to the refractory aggregate, these refractory compositions often include various binders, density reducing filler materials, and plasticizers, as well as a stiffening agent and a set retarder that can be added in predetermined weight ratios to achieve optimal performance during spray application of the composition.

The refractory compounds disclosed in U.S. Pat. No. 5,302,563 provide low density, substantially alkali metal oxide free refractory compositions, which contain less than about 0.1 weight percent alkali metal oxides, resist slumping when applied by spraying, while simultaneously providing a residence time of up to about 30 to 40 minutes without blocking the spray apparatus. The dried density of these compositions is below 100 pounds per cubic foot ("p.c.f."), and is typically between about 80 and 95 p.c.f. Also, the alkali metal containing components of these compositions total no more than about 0.1% of the overall composition, and disposable linings formed from these refractory compositions enhance the longevity of the permanent linings within the casting vessel by limiting the fusion of the disposable liner with the surface of the permanent lining.

The density reducing filler materials, previously added to control the density of the lining composition, include inorganic or organic fibers, expanded inorganic or organic materials, or other lightweight filler materials. Typically, coarse or fine paper fibers, rockwool, glass fibers, expanded clay, and expanded polystyrene beads are used. However, these materials can compromise the strength and chemical durability of the lining. Filler materials used in the prior art often form voids in the lining material that allows slag and molten metal to enter pores in the surface of the lining, where it attacks the lining material and causes corrosion of the liner surface. If the filler material contains fibers, an interconnected porosity can result, which can increase the rate of corrosion. Polystyrene beads, which decompose on heating, leaving only residual carbon, are an improvement over fibrous filler materials, because a continuous pore network is not formed. However, when these beads decompose, spherical voids form which are interconnected with other pores in the lining material.

Hollow, ceramic microspheres, by their structure, are also voids, but these voids are encapsulated by a solid ceramic shell that isolates the voids from the interconnected porosity network. As a result, lining material strength and durability are not compromised. U.S. Pat. Nos. 4,022,358, 4,874,726, and 5,252,526 disclose microspheres with a particle size of about 1 to 350 microns as a density reducing filler material for alumina and silica based refractory materials. These hollow, ceramic microspheres, available commercially under the name Fillite, are stronger and have better thermal insulation properties than other density reducing filler materials, and are highly compatible with silica and alumina based refractory materials. However, ceramic microspheres have not been used previously with basic refractory materials, such as magnesia, because of the anticipated problems of corrosion and the formation of low melting compounds.

SUMMARY OF THE INVENTION

The present invention now provides a corrosion resistant, sprayable refractory material that combines the strength, thermal conductivity, and density reducing properties of ceramic microspheres with the advantages of alkali metal free, basic refractory compositions, such as magnesia and olivine. This material can be used as a lining composition that can be easily removed from the permanent liner of a tundish or other vessel, provides a uniform layer without significant slumping of wet material at a subsequent dried density of less than about 105 p.c.f. with low open porosity, allows a spray gun residence time of up to about 90 minutes or more without blockage, and is essentially free of alkali metal oxides to reduce the problem of contamination and/or premature deterioration of the permanent liner. The use of ceramic microspheres as a density reducing filler material imparts satisfactory chemical and high temperature resistance, while providing ease of removal after cooling and improved resistance to corrosion and to cracking during air drying or curing.

In particular, the present invention provides a corrosion resistant, low density, substantially alkali metal free refractory composition with less than about 0.1 percent alkali metal oxides with the advantages of ceramic microspheres as a density reducing filler material. The compositions of the present invention have greatly improved dry powder flow and improved pumping speed for wet material. Slumping is reduced when the material is applied by spraying, and a residence time of up to about 90 minutes without blocking the spray apparatus is provided. The inclusion of ceramic microspheres as a density reducing filler material reduces the dried density of the compositions below about 105 p.c.f., and typically between 80 and 105 p.c.f. The anticipated compatibility problems of magnesia based refractory materials and the microspheres, which include corrosion and the formation of low melting compounds, have been avoided, and tests show that compositions incorporating ceramic microspheres perform as well or better than those that utilize polystyrene beads, without the formation of porosity and loss in strength associated with other materials. The low level of alkali containing components reduces fusion between the disposable and the permanent linings, and enhances the longevity of the permanent linings.

DETAILED DESCRIPTION OF THE INVENTION

In the following description, all references to percentage or % refer to percent by weight unless otherwise noted.

The present invention is directed to refractory compositions that include, as a principal component, a basic refractory aggregate, such as magnesia, magnesite, doloma, dolomite, olivine, calcia, and combinations thereof, and ceramic microspheres as a density reducing component. For disposable casting vessel or tundish linings, the aggregate is most preferably one based on magnesia or other source of MgO. The preferred density reducing filler material is ceramic microspheres, typically silica or alumina/silica, with a particle size of about 5 to 500 microns, an average particle density of about 0.6 to 0.8 g/cc, and an average bulk density of about 0.35 to 0.45 g/cc. These glass hard, inert, hollow silicate spheres, which have a melting temperature of at least 1200° C., a crush strength of 1500 to 3000 pounds per square inch, and a thermal conductivity of about 0.09 W/m° C., are available commercially under the name Fillite 500.

The magnesia aggregate should contain at least about 50 to 95% MgO, and any source of MgO providing a water insoluble particulate refractory grain, such as dead burned magnesia, periclase, or the like, may be selected. In formulating an alkali metal free composition, the remaining percentage of the refractory aggregate should not contain any significant amount of alkali metal components.

The refractory aggregate constitutes more than about 80% of the overall composition, and, preferably, more than about 84%. When magnesia is used as the aggregate, a portion may be substituted with olivine. The MgO content of the overall composition can vary from about 37% to 98% while olivine can be used in an amount up to 45%.

The ceramic microspheres are added in an amount of between about 1 and about 20%. These microspheres are encapsulated, isolated voids, and, thus, do not form interconnected porosity in the lining material. The reduction in cracking and porosity prevents molten slag or metal from entering the surface of the lining composition and causing corrosion. Therefore, the strength and chemical durability of a finished lining are not compromised. Ceramic microspheres have superior strength when compared to materials of similar size and density, improve the dry powder flow of the compositions, and do not decompose upon heating. Therefore, the porosity of the lining is reduced as compared to linings utilizing other filler materials.

Any of a wide variety of other density reducing filler materials may also be utilized in conjunction with the ceramic microspheres, including inorganic or organic fibers, expanded inorganic or organic materials, or other lightweight fillers. Paper fibers (either coarse or fine), ceramic or glass fibers, rockwool, and expanded polystyrene beads are typical components that can be added.

Advantageously, a cellulose fiber is used in combination with the ceramic microspheres as the density reducing filler material. It is preferred that the organic fiber be coarse paper fibers, fine paper fibers or mixtures thereof. These fibers generally would have fiber lengths of from about 0.1 to about 1.5 mm. The use of these fibers in conjunction with ceramic microspheres provides the refractory composition with a dried density of as low as about 91 pounds per cubic foot. To further reduce the density, up to about 0.2% of a foaming agent, such as sodium lauryl sulfate may be added to the composition, which provides the refractory composition with a dried density as low as 80 pounds per cubic foot.

A plasticizer may be added in an amount of about 1.0 to about 10% to enhance the ability of the composition to adhere to itself and to the surfaces to which it is applied. The preferred plasticizer is silica fume, which also improves the pumpability of the compositions by providing the rheology required to facilitate pumping. Other conventional plasticizers can also be used.

The compositions preferably contain the above components. However, some compositions can contain about 0.1 to about 2% of a stiffening agent and about 0.1 to about 2% of a set modifying agent. The stiffening agent can be added to promote initial gelling properties to the composition when it is mixed with water. For spray application, an amount of water in the range of about 10 to 30% is typically added to provide a pumpable viscosity. Preferably, the stiffening agent is an alkali-free phosphate compound, such as an alkaline earth phosphate, an aluminum phosphate, encapsulated phosphoric acid, ammonium phosphate or an organic phosphate compound. Of these compounds, monocalcium phosphate is the most advantageous. The stiffening agent also imparts high temperature strength to the composition.

The set modifying agent can be added to control the gelling properties of the stiffening agent, thus imparting a practical residence time to the composition. The set retarding agent provides a prolonged setting time, and is added in an amount of about 0.1 to about 2% and is preferably an organic acid. Any di- or tri-basic carboxylic acid may be used, with citric, tartaric, oxalic or malic acid being representative. Of these, powdered citric acid has been found to be the most advantageous.

These agents also may be further adjusted within the previously described ranges to control the viscosity of the refractory composition while being pumped through a spray apparatus. Optimum performance during application of the composition is achieved by controlling the weight ratio of stiffening agent to set retarding agent. A ratio of about 3:1 to 1:3 is suitable, with between about 1.5:1 to 1:1.5 being preferred. The most advantageous ratio is about 1:1. At this level, these agents co-act to prevent slumping of the refractory material during the period of time immediately following spraying and prior to drying.

The set retarding agent prevents the refractory composition from prematurely reaching too high a viscosity which would effectively restrict flow through the spray apparatus by providing a prolonged setting time. It is preferred that the set retarding agent be used in an amount which provides a refractory material residence time within the spray apparatus of up to about 90 minutes without causing blockages in the apparatus. Therefore, the composition allows spraying to resume after a 30–40 minute work stoppage without the necessity of debriding the spray head or hoses connected thereto. If used, a 1:1 weight ratio of powdered citric acid and monocalcium phosphate is most preferred for imparting the desired residence time and anti-slumping characteristics to the composition.

The refractory composition of the present invention may further comprise from about 0.1 to 2% of a secondary binder. It has been found that the addition of this binder contributes to refractory strength while also improving air entrainment to the composition to further reduce its density. It is preferred that this binder be an alkaline earth lignosulfonate such as, for example, calcium lignosulfonate. Other conventional binders can also be used.

EXAMPLES

The following non-limiting examples further illustrate the preferred embodiments of the present invention.

The following test formulations were prepared by dry blending the components to a homogeneous batch, combining the batch with water, and mixing the combination to substantially uniformly distribute the water throughout the batch. The formulations were used in a number of spray application tests in the field and in the laboratory. The compositions were tested as a disposable tundish liner at several locations. The compositions met or exceeded the requirements for spray application, i.e. spray rates, residence time, slump resistance, etc. The resulting linings also met or exceeded performance requirements in the areas of density, strength, drying, resistance to cracking, preheating, molten metal and slag resistance, durability and sequencing requirements. The deskullability of the linings were found to be good in all locations and improved over those which use conventional alkali oxide containing refractory compositions.

Unless otherwise identified, the ceramic microspheres used in the compositions of these examples was FILLITE 500, which is available from the Fillite division of Boliden Intertrade, Inc., Atlanta, Ga. These ceramic microspheres have a particle size of about 5 to 500 microns, an average particle density of about 0.6 to 0.8 g/cc, and an average bulk density of about 0.35 to 0.45 g/cc. They are glass hard, inert, hollow silicate spheres, filled with a gas mixture of 70% carbon dioxide and 30% nitrogen, and comprise 27–33% alumina, 55–65% silica, and a maximum of 4% iron, as $Fe_2O_3$. The microspheres have a melting temperature of at least 1200° C., a crush strength of 1500 to 3000 pounds per square inch, and a thermal conductivity of about 0.09 W/m° C.

Example 1

It has been determined that a sprayable composition that contains ceramic microspheres has reduced air curing crack tendencies relative to a similarly formulated composition without the microspheres. The following formulations were batched, combined with water to form a wet plastic mass, and sprayed onto the walls of a simulated tundish.

TABLE 1

| Material | A | B |
| --- | --- | --- |
| MgO | 85.5% | 91.5% |
| Olivine | 1.0 | 2.0 |
| Ceramic Microspheres | 8.0 | — |
| Silica Fume | 3.0 | — |
| Paper Fibers | 1.0 | 3.0 |
| Monocalcium Phosphate | 0.5 | 0.5 |
| Citric Acid | 0.5 | 0.5 |
| Calcium Lignosulfonate | 0.5 | 0.5 |
| Bentonite | — | 2.0 |

Upon application of both mixes to a coating thickness of 1½ inch and allowing each to air dry for 1½ hours, mix B without the ceramic microspheres developed cracks over its entire surface which ranged from 3–6 mm in width. The formation of cracks was significantly reduced in the lining composition that contained ceramic microspheres, wherein cracks of only 1–3 mm in width were formed in only the corner areas.

Example 2

Tests were run to determine the effects of ceramic microspheres level on the performance of lining materials. Lining compositions were formulated as shown in Table 2 with the amount of ceramic microspheres varying from 6–10%. Each was mixed with water to form a wet plastic mass and sprayed onto test surfaces.

TABLE 2

| Material | A | B | C |
| --- | --- | --- | --- |
| MgO | 88.5% | 86.5% | 84.5% |
| Ceramic Microspheres | 6.0 | 8.0 | 10.0 |
| Silica Fume | 3.0 | 3.0 | 3.0 |
| Paper Fibers | 1.0 | 1.0 | 1.0 |
| Monocalcium Phosphate | 0.5 | 0.5 | 0.5 |
| Citric Acid | 0.5 | 0.5 | 0.5 |
| Calcium Lignosulfonate | 0.5 | 0.5 | 0.5 |

Physical properties for each lining composition were determined during and after application and treatment. The results are shown in Table 3.

TABLE 3

| MEASURED PROPERTY | A | B | C |
| --- | --- | --- | --- |
| Moisture Level (%) | 15.1 | 15.0 | 17.7 |
| Dry Delivery Rate (lbs./min) | 98 | 82 | 116 |
| Curing Crack Size (mm) | 1–2 | 0–1 | 1–2 |
| Dried Density (p.c.f.) | 102 | 101 | 95 |

This data shows that within normal processing limits (i.e., water additional levels). The additive levels of ceramic microspheres tested are all compatible with the lining composition formulation (the measured lining composition characteristics are all within acceptable limits).

Example 3

The use of silica fume was found to improve the wet flow properties of lining compositions containing ceramic microspheres. Silica fume levels were varied from 1–5% in lining compositions as formulated in Table 4.

TABLE 4

| MATERIAL | A | B | C |
| --- | --- | --- | --- |
| MgO | 88.5% | 86.5% | 84.5% |
| Ceramic Microspheres | 8 | 8 | 8 |
| Silica Fume | 1 | 3 | 5 |
| Paper Fibers | 1 | 1 | 1 |
| Monocalcium Phosphate | 0.5 | 0.5 | 0.5 |
| Citric Acid | 0.5 | 0.5 | 0.5 |
| Calcium Lignosulfonate | 0.5 | 0.5 | 0.5 |

Lining compositions according to Table 4 were mixed with water to form a wet plastic mass, and pumped and sprayed. Trends in the properties of the lining compositions are shown in Table 5.

TABLE 5

| PROPERTY | A | B | C |
| --- | --- | --- | --- |
| Pumping Amps | 13 | 12 | 10 |
| Moisture Level (%) | 16.7 | 15.1 | 15.2 |
| Dried Density (p.c.f.) | 104 | 102 | 105 |
| Curing Crack Size (mm) | 1–2 | 1–2 | 1–2 |

The measured physical properties were all within acceptable limits. Moreover, increased silica fume level was found to lower pumping amps, a measure of pumping ease. The lower the pumping amperage draw, the easier the material is to pump, and a lining composition which pumps easily is more desirable than one which does not.

Example 4

Low density is a highly desirable property in a sprayable composition. One method to reduce the density of a lining composition is by the addition of a foaming agent. To test the compatibility of a sprayable lining composition containing ceramic microspheres, sodium lauryl sulfate, a foaming agent, was added to the composition in Table 6.

TABLE 6

| MATERIAL | |
| --- | --- |
| MgO | 86.45% |
| Ceramic Microspheres | 8.0 |
| Silica Fume | 3.0 |
| Paper Fibers | 1.0 |

TABLE 6-continued

| MATERIAL | |
| --- | --- |
| Monocalcium Phosphate | 0.5 |
| Citric Acid | 0.5 |
| Calcium Lignosulfonate | 0.5 |
| Sodium Lauryl Sulfate | 0.05 |

In addition to spray properties comparable to similar formulations without the foaming agent, this lining composition had the additional benefit of a dried density that was decreased by more than 6% relative to standard formulations.

Example 5

Experiments were run to test the effect of lowered bond levels on the performance of herein described lining materials. During a series of tests, a composition was prepared as in Table 7, combined with water to form a wet plastic mass and sprayed onto the walls of a simulated tundish.

TABLE 7

| MATERIAL | |
| --- | --- |
| MgO | 87.84% |
| Ceramic Microspheres | 8.1 |
| Silica Fume | 3.0 |
| Paper Fibers | 1.0 |
| Sodium Lauryl Sulfate | 0.06 |

Physical performance values were determined for this lining composition during and after application and treatment. Key results for same appear in Table 8.

TABLE 8

| MEASURED PROPERTY | |
| --- | --- |
| Moisture Level (%) | 17.6 |
| Dry Delivery Rate (lbs./min.) | 66 |
| Curing Crack Size (mm) | 1–3 |
| Dried Density (pcf) | 84 |

The material sprayed well, exhibited no signs of slumping during application, and proved to have a subjective strength suitable to allow use for intended lining applications. As can be seen in Table 8, the density values which were subsequently recovered for this composition were desirably lower than comparable compositions herein previously reported, which contained bond components such as monocalcium phosphate, citric acid and calcium lignosulfonate.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

We claim:

1. A substantially alkali metal-free disposable lining material comprising;

a basic refractory aggregate comprising magnesia, magnesite, olivine, doloma, dolomite, calcia, or mixtures thereof; and at least one density reducing material comprising hollow ceramic microspheres in an amount sufficient to reduce the density of the material;

wherein the material contains less than about 0.1 weight percent of alkali metal components.

2. The material of claim 1, further comprising an alkali free stiffening agent in an amount sufficient to impart stiffening properties to the material, in combination with a set retarding agent, which is added in an amount sufficient to provide a prolonged setting time to the material when mixed with water.

3. The material of claim 2 wherein the stiffening agent and set retarding agent are present in a weight ratio of between about 3:1 and about 1:3.

4. The material of claim 2 wherein the aggregate is a source of magnesia having at least about 85% by weight MgO, the stiffening agent is an alkaline earth phosphate, an aluminum phosphate, encapsulated phosphoric acid, ammonium phosphate or an organic phosphate compound, and the set retarding agent is citric, tartaric, oxalic or malic acid or mixtures thereof.

5. The material of claim 1, wherein the hollow ceramic microspheres comprise silica, alumina or mixtures thereof, and have diameters of from about 5 to about 500 microns.

6. The material of claim 1, further comprising a plasticizer in an amount sufficient to enhance the ability of the material to adhere to vertical surfaces after mixing with water.

7. A disposable lining material comprising;

from about 0.1 to about 2 weight percent of a stiffening agent comprising an alkali metal free phosphate compound;

from about 0.1 to about 2 weight percent of a set retarding agent;

from about 0.1 to about 15 weight percent of at least one density reducing material comprising hollow ceramic microspheres having diameters of about 5 to about 500 microns;

from about 0.1 to about 5 weight percent of a plasticizer; and at least about 80 weight percent of a basic refractory aggregate comprising magnesia, magnesite, olivine, doloma, dolomite, calcia, or mixtures thereof.

8. The material of claim 7 wherein the stiffening agent is an alkaline earth phosphate, an aluminum phosphate, encapsulated phosphoric acid, ammonium phosphate or an organic phosphate compound.

9. The material of claim 7 wherein the stiffening agent is monocalcium phosphate.

10. The material of claim 7 wherein the set retarding agent is an organic acid.

11. The material of claim 7 wherein the set retarding agent is citric, tartaric, oxalic or malic acid or mixtures thereof.

12. The material of claim 7 wherein the stiffening agent and set retarding agent are present in a weight ratio of between about 3:1 and about 1:3.

13. The material of claim 7 further comprising a second density reducing material, comprising an inorganic fiber, an organic fiber, an expanded inorganic material, an expanded organic material or mixtures thereof.

14. The material of claim 7 wherein the second density reducing material is a cellulose fiber, expanded polystyrene beads or mixtures thereof.

15. The material of claim 7 wherein the plasticizer is silica fume.

16. The material of claim 7 wherein the aggregate is a source of magnesia having at least about 85% by weight MgO.

17. The material of claim 7 further comprising from about 0.01% to about 0.2% of a foaming agent of sodium lauryl sulfate.

18. A vessel for handling molten metal comprising;

means for holding molten metal therein;

a relatively permanent refractory lining disposed within the holding means for protecting the holding means against the effects of the molten metal; and a disposable refractory lining disposed upon at least a portion of the permanent refractory lining, the lining comprising a lining material consisting essentially of a basic refractory aggregate of magnesia, magnesite, olivine, doloma, dolomite, calcia, or mixtures thereof; and at least one density reducing material of hollow ceramic microspheres in an amount sufficient to reduce the density of the lining material.

19. A method for installing a disposable refractory lining which comprises;

forming a disposable lining composition consisting essentially of a basic refractory aggregate of magnesia, magnesite, olivine, doloma, dolomite, calcia, or mixtures thereof; and at least one density reducing material of hollow ceramic microspheres in an amount sufficient to reduce the density of the lining material;

mixing the disposable lining composition with a sufficient amount of water to form a sprayable mixture; and spraying the mixture onto an inner surface of a molten metal holding vessel to form a disposable lining thereon, which lining has improved resistance against cracking during curing.

* * * * *